Patented Nov. 17, 1925.

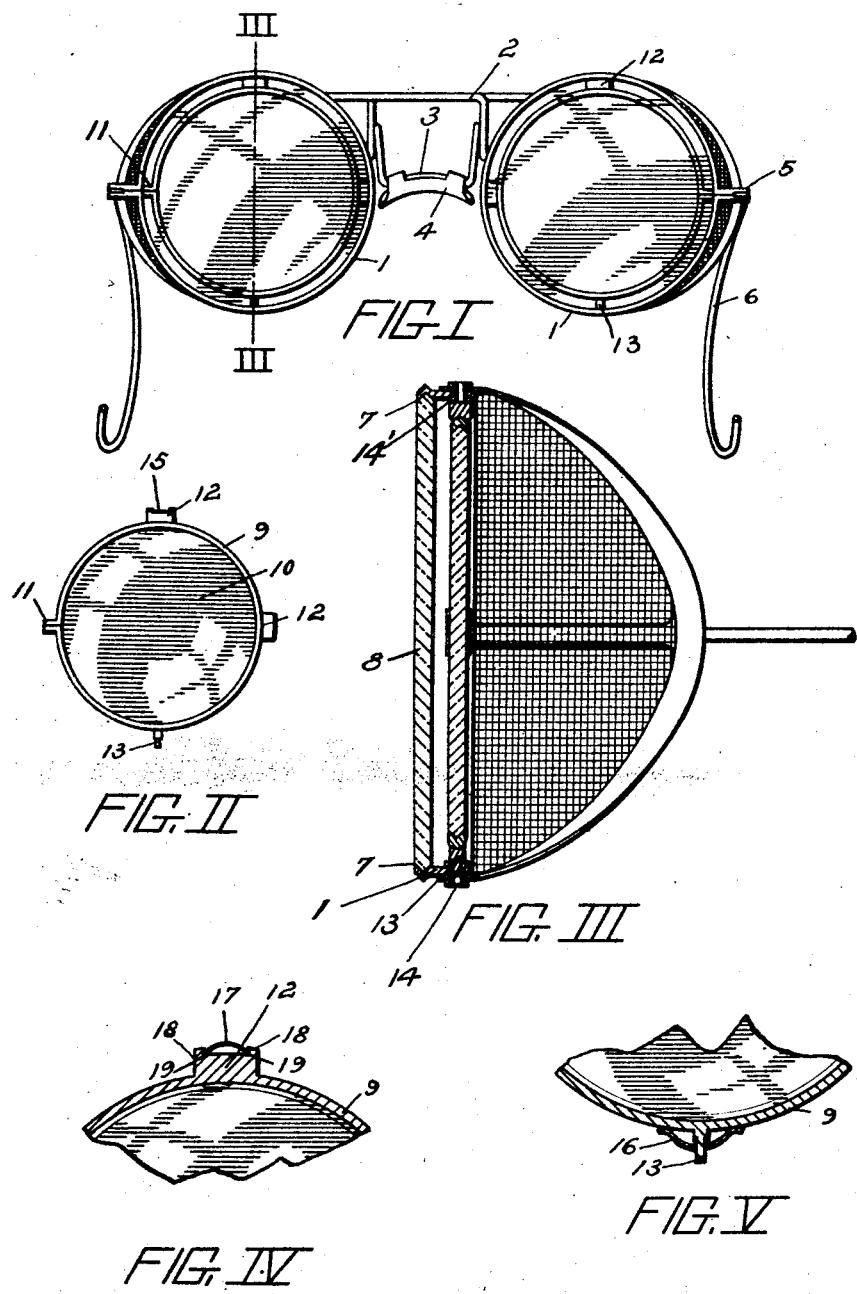

1,561,958

UNITED STATES PATENT OFFICE.

GEORGE L. TULLY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

GOGGLES.

Application filed September 18, 1922. Serial No. 588,914.

*To all whom it may concern:*

Be it known that I, GEORGE L. TULLY, a citizen of the United States, residing at Southbridge, in the county of Worcester and State of Massachusetts, have invented certain new and useful Improvements in Goggles, of which the following is a specification.

This invention relates to new and useful improvements in protection goggles and more particularly to means for attaching prescription lenses to the ordinary goggle commercially used at the present time.

The protection goggles in use at the present time and especially those adapted for use by iron workers and the like for protecting the eyes are made with a substantially large lens rim with a width thereto whereby the usual guards for the sides of the eyes may be pivoted to the lens rims and folded outwardly into position or folded inwardly when the goggles are not in use.

It is one of the main objects of my invention to provide a prescription lens holder which can be quickly and readily fitted into position within the goggle rim and disposed in alignment with the lenses in the goggle, should the person wearing the goggles ordinarily use a prescription lens. Heretofore a person needing a prescription lens had either to remove his prescription glasses or obtain a pair of protection goggles large enough to fit over his prescription glasses but with my improvement one may be provided with a pair of prescription lenses mounted in separate rims and readily fitted into position within the lens rims of the goggles, means being provided whereby these prescription lenses will be securely held in position during use and so arranged that they may be quickly and readily removed or replaced.

Another object of my invention is the provision of a detachable prescription lens for protection goggles which is so constructed that it can be readily fitted into position within the rim of a well known type of protection goggle now on the market and the same can be quickly and readily removed when so desired.

With the above and other objects in view the invention consists in the novel features of construction, the combination and arrangement of parts hereinafter more fully set forth, pointed out in the claims and shown in the accompanying drawings, in which—

Figure I is a front elevation of a pair of protection goggles showing my improved prescription lenses in position within the lens rims of the goggles.

Figure II is a plan view of one of the prescription frames.

Figure III is a transverse sectional view on the line III—III of Figure I.

Figure IV is a longitudinal sectional view of one of the friction gripping members illustrating a modified form thereof.

Figure V is a detailed plan view of one of these prescription frames illustrating a slightly modified form of the invention.

In Figure I, I have illustrated a pair of goggles which are commonly used at the present time to considerable extent for protecting the eyes against flying particles, heat, etc. The goggles as illustrated include the rims 1 suitably connected by means of the rods 2 which are provided with a nose bridge supporting portion 3 upon which the bridge 4 is mounted. The rims 1 are provided with the usual temple ears 5 having the temples 6 connected thereto. Attention is called to the fact that the rims 1 are fairly wide and provided at one side thereof with the lens receiving groove 7 in which is fitted the plain lens 8 which is used in connection with the ordinary goggle.

In Figure II, I have illustrated in plan view a lens receiving rim 9 in which is fitted the prescription lens 10. The rim 9 is provided with ears 11 adapted to be connected for retaining the lens 10 in position within the rim 9. Secured to the periphery of the rim 9 are the lugs 12 having a substantially curved outer surface formed coincident with the inner surface of the rims 1 whereby the faces of the lugs 12 will frictionally engage the inner surface of the rims 1 to retain the frames 9 in position within the rims 1 and in alignment with the lenses 8.

In order to retain the frames or rims 9 in position within the rims 1 I provide a pintle 13 which is formed upon one side of the rim 9 and adapted to be fitted into the rivet opening 14 formed within the rims 1.

Upon the opposite side of the rim is the pintle 13 and the lug 12 is provided with a depressed portion 15 adapted to receive the projecting portion of the rivet 14'.

In placing the rim or frame 9 in position, the pintle 13 is first inserted within the opening 14 and then by pressing inwardly the lugs 12 will frictionally engage the interior of the rims 1 whereby the rims 9 will be retained in position upon the interior of the rims 1.

In Figure V, I have illustrated a slightly modified form of the prescription lens rim wherein a flat spring member 16 is mounted upon the pintle 13 so that when the pintle 13 is fitted within the opening 14 the spring 16 will be compressed at its intermediate portion so that after the pintle 13 has been placed in position and the rest of the frame fitted into the rim 1 the tension of the spring 16 will force the lugs 12 in frictional engagement with the walls of the rim 1, and securely retain the rims 9 in position.

In Fig. IV, I have illustrated another form of the invention wherein the lug 12 is provided with a frictional spring 17. The outer faces of the lug 12 are provided with a recess 18 having undercut grooves 19 at each end thereof into which are fitted the ends of the spring 17 leaving the central bowed portion extending outwardly beyond the face of the lug so that it will be frictionally engaged with the inner walls of the rims 1 and thus retain the prescription lens and rims in their proper positions within the goggle rims and it will be apparent that these lens rims 9 may be quickly and readily moved when so desired.

I claim:

1. The combination with the lens frame, of a protection goggle, of an auxiliary frame having lugs extending from the periphery thereof, certain of said lugs having pivotal connection with the first frame, and certain of said lugs having frictional engagement with the first frame to retain the auxiliary frame in operative position.

2. The combination with a main lens retaining rim, of an auxiliary lens frame arranged therein, lugs extending from the periphery of the auxiliary frame, certain of said lugs having pivotal connection with the main rim and frictional means carried by certain of the lugs for engagement with the main lens rims for retaining the auxiliary frame in position within the main rim.

3. The combination with a main lens retaining rim, of an auxiliary lens frame arranged therein, lugs extending from the periphery of the auxiliary frame, certain of said lugs having pivotal connection with the main rim, frictional means carried by certain of the lugs for engagement with the main lens rim for retaining the auxiliary frame in position within the main rim, and yielding means for pressing the frictional means into contact with the main rim.

4. The combination with the lens frame of a goggle, of an auxiliary frame having lugs extending from the periphery thereof, certain of said lugs having a pin and socket connection with the first frame, and certain of said lugs having frictional engagement with the first frame to retain the auxiliary frame in operative position.

GEORGE L. TULLY.